Patented May 14, 1946

2,400,304

UNITED STATES PATENT OFFICE 2,400,304

METHOD OF MANUFACTURING METAL COATED ARTICLES

William W. Hamel, New York, N. Y., assignor of two-thirds to Armand E. Lackenbach, and one-third to Louis Stark and Samuel Kaplan, all of New York, N. Y.

No Drawing. Application September 18, 1941, Serial No. 411,342

6 Claims. (Cl. 117—60)

The present invention relates to the art of coating with metals, and more particularly, to the coating of articles and materials which are ordinarily consumed or damaged by high temperatures with a sprayed-on layer of fused metal.

It is a general object of the invention to provide a process whereby articles and materials which are ordinarily destroyed, or at least damaged, at the temperatures of fused metals and alloys, are coated with a continuous and air-impervious layer of metal which is sprayed onto such articles or materials in the fused condition.

The present invention is of special advantage in connection with the application by spraying, of a layer or coating of metal upon paper, wood, plywood, leather, textiles, including natural and artificial fibers, regenerated cellulose sheets or other objects, rubber, etc., and also upon materials which are more resistant to heat than, for example paper, but which are likewise damaged by high temperatures, such as various plastics, including those of resinous character and also other types, such as ceramic ware, glass, etc.

According to the invention, these more or less heat-sensitive materials are provided with either very thin or relatively thick, adherent and impervious coatings of a metal or alloy which is sprayed in the fused or molten condition upon the object to be coated. Among the metals and alloys which may be employed are copper, gold, silver, tin, zinc, various steels, including stainless steels, such as the well-known nickel-, chromium-, bronze-steels, brass and other metals and alloys having a melting point considerably above the temperatures at which the base material, that is, the material to be coated begins to be damaged. In this way, metallic coatings may be produced on non-conducting materials in an extremely simple and economical manner.

I have found that the various heat-sensitive base materials above enumerated, and other materials of similar character can be subjected to a spray of fused metal, which ordinarily would destroy or damage the base material, if the latter is first wetted with a liquid which itself is evaporated during the course of the spraying operation. It is important that this protecting liquid thoroughly wet the surface to be coated and to this end such surface should be cleaned of any liquid-repelling impurities. Where the surface is one which is ordinarily not easily wetted by the selected liquid, a suitable wetting agent may be added to such liquid.

The protecting liquid may be of varied character, provided that it is able thoroughly to wet the surface to be coated and evaporates, preferably without any residue, at the temperatures of the applied metal spray. The cheapest liquid, of course, is water, but I have found that water alone is not entirely satisfactory in all instances. A liquid of more general applicability is a 50-50 mixture of water and glycerine. This proportion is not critical and may be varied within rather wide limits, even up to the practical exclusion of water. In place of glycerine, other liquids, preferably those of greater body than water, may be used, such as various glycols, and preferably water-miscible substances capable of being mixed with various amounts of water. The protecting liquid should, of course, itself have no damaging action on the base material and should preferably be non-poisonous. The protecting liquid may be applied by brushing, spraying, dipping or in any other suitable way. It will be evident that in place of a liquid, a powder can be used which melts and boils or sublimes at the temperature of the sprayed metal.

In the case of hard and smooth-surfaced articles, such as glass, ceramic ware, resins, etc., the surface is preferably first roughened either chemically as by being subjected to the action of an acid or alkali, or, preferably mechanically, as by sand-blasting or scratching with emery paper or the like. Such pre-treatment insures a firm anchoring of the sprayed metal upon the base material.

In carrying out my process, the article to be coated is suitably supported in any suitable way so as to remain more or less stationary under the blast of the sprayed metal. The metal may be sprayed in any manner known in the art of metal-spraying as, for example, by means of a spray-gun to which the metal or alloy is fed in the form of a wire and melted either electrically or by means of a gas flame. The pressure, which may be of the order of 10–12 lbs. gage, may be applied by air, or preferably by a current of carbon dioxide which prevents surface oxidation of the metal. It is not necessary to pre-heat the gas, although this may be done if desired. The spraying can be done in air, although a non-oxidizing atmosphere will have known advantages in certain cases.

The spraying must be done very rapidly, the time element being of the order of a second or so, but in any case will be determined by the sensitivity of the base material to heat and its heat-conductivity. In certain instances, it may be desirable to direct a blast of cool air upon the opposite side of the article being sprayed, but this ordinarily will not be necessary.

Where it is desired to provide a relatively thick coating of metal, I prefer to apply first a very thin coat and then allow the coated article to cool. Successive coats are then sprayed onto the article, the successive coats being relatively thin and a cooling period preferably intervening therebetween so as to insure that the base material, or the essential structure thereof, will not be destroyed. Where base materials of greater sensitivity to heat are to be coated on both sides, I prefer to first coat one side, then apply the protecting liquid or powder to the opposite side, and thereafter spray the latter. In the case of fibers which absorb the protecting liquid, the spraying should be so conducted, especially where the second side is sprayed, that the vapors are afforded an opportunity to escape through the still uncoated fibers so as to avoid the escape of vapor through the layer of sprayed-on metal. Quenching or cooling in air will ordinarily be sufficient to prevent injury of the base material by the deposited metal. It will be evident that the protecting liquid layer not only forms a protecting film of vapor which prevents the transmission of damaging heat to the base material, but also acts to reduce the temperature of the metal coating as it is applied.

The deposited metal coating adheres so firmly to the base material that the metal-coated article can be subjected to mechanical stresses without danger of separation. The coating may be applied for ornamental or utilitarian purposes, or both, and the metal deposit can be subjected to buffing or polishing or any other desired finishing treatments. Paper containers coated by me with a thin layer of aluminum or tin have proved to be completely impervious to air and liquids, and are admirably suited for use in the various canned goods industries. When applied to plywood, my process, despite the use of an aqueous protecting liquid (a 50% glycerine solution in water), did not cause warping and yielded a surface layer of metal which adhered strongly to the wood base.

The sprayed-on metal coating need not, of course, be the final or surface coating of the finished article. If desired, an article coated in the manner above described may be given an electrolytic coating of any suitable metal in an electrolytic bath, the sprayed-on metal layer serving to provide a conducting cathode. It will be obvious that by conducting the electrolytic treatment on an article, part of whose sprayed-on metal coating is covered with a non-conducting wax or varnish or the like, or by spraying different metals upon different parts of the base material, different ornamental effects can readily be attained.

I have found that the protecting film of vapor is so effective that metals can be sprayed onto heat-sensitive base materials, like paper, which have a very high melting point, such as stainless steel and other ferrous alloys. In each case, the rate of spraying the fused metal will depend upon the fusion temperature of the metal, metals or alloys of high melting points requiring a shorter period for spraying to prevent injury to sensitive base materials. The safe spraying period for any particular article can be readily determined by simple experiment for any particular metal to be sprayed thereon.

I claim:

1. Process for coating paper articles with aluminum, which comprises wetting the surface of the articles with glycerine and then spraying fused aluminum upon the wetted surface.

2. Process according to claim 1, wherein a 50% solution of glycerine in water is employed.

3. Process for the coating of a base with a layer of fused metal, which comprises applying to the base a layer of a protecting material which is driven off during the application of the molten metal, and then spraying a molten metal upon the base, the protecting material being an aqueous solution of a member of the group consisting of glycerine and glycols, and the metal being one which melts at a temperature higher than the vaporizing temperature of the protecting material.

4. Process for the coating of a base with a layer of fused metal, which comprises applying to the base a layer of a protecting material which is driven off during the application of the molten metal, and then spraying a molten metal upon the base, the protecting material being an aqueous solution of glycerine, and the metal being one which melts at a temperature higher than the vaporizing temperature of the protecting material.

5. Process for the coating of a base with a layer of fused metal, which comprises wetting the surface of the base with a 50% solution of glycerine in water, and spraying the coating metal in the fused condition upon the wetted base.

6. Process according to claim 3, wherein the base is composed of an organic fibrous material.

WILLIAM W. HAMEL.